United States Patent [19]

Bruno et al.

[11] Patent Number: 4,828,206
[45] Date of Patent: May 9, 1989

[54] BLOW OFF PANEL FOR CONTROLLING HYDRODYNAMIC RAM

[75] Inventors: Joseph W. Bruno, Shirley; Carlos Cacho-Negrete, Massapequa, both of N.Y.

[73] Assignee: Grumman Aerospace Corporation, Bethpage, N.Y.

[21] Appl. No.: 67,736

[22] Filed: Jun. 26, 1987

[51] Int. Cl.$^4$ .............................................. B64C 3/26
[52] U.S. Cl. .................................. 244/132; 244/121; 220/900; 428/103
[58] Field of Search ............... 244/121, 132; 89/36.02, 89/36.11; 220/900; 428/102, 103, 912

[56] References Cited

U.S. PATENT DOCUMENTS

| | | |
|---|---|---|
| 2,053,048 | 9/1936 | Robinson . |
| 2,161,802 | 6/1939 | Ganahl . |
| 2,385,461 | 9/1945 | Pancoe . |
| 2,483,916 | 10/1949 | Lysak . |
| 2,973,170 | 2/1961 | Rodman . |
| 3,135,486 | 6/1964 | Wing . |
| 3,265,417 | 8/1966 | Kastan . |
| 3,771,748 | 11/1973 | Jones . |
| 4,206,895 | 6/1980 | Olez . |
| 4,256,790 | 3/1981 | Lackman et al. . |
| 4,299,871 | 11/1981 | Forsch . |
| 4,310,132 | 1/1982 | Robinson et al. . |
| 4,331,495 | 5/1982 | Lackman et al. . |
| 4,350,728 | 9/1982 | Huang et al. . |

FOREIGN PATENT DOCUMENTS

| | | | |
|---|---|---|---|
| 323763 | 8/1920 | Fed. Rep. of Germany ...... | 244/132 |
| 593165 | 8/1925 | France ................. | 244/132 |
| 860705 | 1/1941 | France ................. | 220/900 |
| 1575835 | 7/1969 | France ................. | 220/900 |

*Primary Examiner*—Galen Barefoot
*Assistant Examiner*—Rodney Corl
*Attorney, Agent, or Firm*—Richard G. Geib; Daniel J. Tick; Bernard S. Hoffman

[57] ABSTRACT

A wing structure for controlling hydrodynamic ram and which includes a substructure having a plurality of individual cells each with a respective boundary, a composite skin disposed on the substructure, and perforations disposed through the composite skin which define a plurality of sections in the composite skin such that each section of the plurality of sections of the composite skin is disposed within the confines of each respective boundary of each of the plurality of individual cells of the substructure so that each section of the plurality of sections of the composite skin forms a blow off panel for relieving pressure created by hydrodynamic ram in a respective individual cell of the plurality of individual cells of the substructure.

13 Claims, 5 Drawing Sheets

BLOW OFF PANEL FOR CONTROLLING HYDRODYNAMIC RAM

The present invention was made in performance of Contract No. N62269-C-81-0727 with the U.S. government, which retains a royalty-fee license to practice the invention for government purposes.

BACKGROUND OF THE INVENTION

1. Field of the Invention

The present invention relates to a wet wing. More particularly, it relates to a wet wing having a composite skin utilizing stitches to prevent delamination.

2. Description of the Prior Art

Wet wings of the above mentioned general type are known in the art.

One such wing is disclosed, for example, in a high strain composite skinned wing that utilizes stitches to prevent delamination. The stitches are applied to the wing in a series of substantially mutually perpendicular directions that cross over each other. The final result is a checker board configuration shown in FIG. 1.

When a projectile penetrates a conventional wet wing skin, catastrophic failure of the structure occurs due to the effects of hydrodynamic ram. Hydrodynamic ram causes the impact damage to propagate along the wing skin, which leads to the loss of large sections of the wing skin and ultimate wing failure.

The lines of stitches as taught by the prior art to prevent delamination, have no effect on controlling the damage caused by hydrodynamic ram.

SUMMARY OF THE INVENTION

Accordingly, it is an object of the present invention to provide a blow off panel for controlling hydrodynamic ram that avoids the disadvantages of the prior art.

More particularly, it is an object of the present invention to provide a blow off panel for controlling hydrodynamic ram which contains and isolates the damage from the hydrodynamic ram effect to as small an area as possible and thereby prevent catastrophic failure of the structure due to propagation.

In keeping with these objects, and with others which will become apparent hereinafter, one feature of the present invention resides, briefly stated, in a wing structure for controlling hydrodynamic ram and which includes a substructure having a plurality of individual cells each of which having a respective boundary, and a composite skin disposed on the substructure wherein first means is disposed through the composite skin and which defines a plurality of sections in the composite skin such that each section of the plurality of sections in the composite skin is disposed within the confines of each respective boundary of each of the plurality of individual cells of the substructure.

When the blow off panel for controlling hydrodynamic ram is designed in accordance with the present invention, each section of the plurality of sections of the composite skin forms a blow off panel for relieving pressure created by hydrodynamic ram in a respective individual cell of the plurality of individual cells of the substructure.

In accordance with another feature of the present invention, the first means includes first perforations along which the blow off panel tears off.

Another feature of the present invention is that it further comprises stitches disposed in the first perforations for arresting the growth of delamination in the composite skin created by impact damage.

Still another feature of the present invention is that the blow off panel has corners at which the stitches touch so that the blow off panel tears off more cleanly and completely.

Yet another feature of the present invention is that the stitches are a composite.

Still another feature of the present invention is that the composite stitches are kevlar/epoxy.

Yet still another feature of the present invention is that the kevlar/epoxy composite stitches and the composite skin are cocured.

Still yet another feature of the present invention is that it further comprise second means disposed in the composite skin for preventing the composite skin from cracking from the first perforations and for preventing the growth of running cracks created by penetration damage.

Another feature of the present invention is that the second means includes a composite.

Yet another feature of the present invention is that the second means composite is fiberglass/epoxy.

Still another feature of the present invention is that it further comprises third means for mounting the composite skin to the substructure.

Yet still another feature of the present invention is that the composite skin contains second perforations for receiving the third means.

Still yet another feature of the present invention is that it further comprises fourth means disposed in the composite skin for preventing the composite skin from cracking from the second perforations.

Another feature of the present invention is that the fourth means includes a composite.

Finally, still a further feature of the present invention is that the fourth means composite is fiberglass/epoxy.

The novel features which are considered characteristic for the invention are set forth in particular in the appended claims. The invention itself, however, both as to its construction and its method of operation, together with additional objects and advantages thereof, will be best understood from the following description of the specific embodiment.

DETAILED DESCRIPTION OF THE PREFERRED EMBODIMENT

Figure 2:
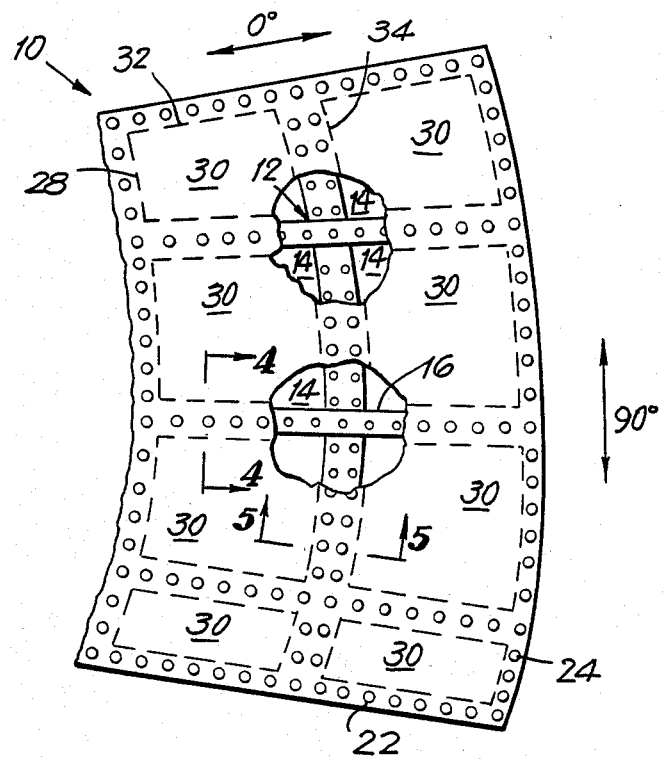
FIG. 2 is a typical secton of a wet wing employing the blow off panel of the present invention for controlling hydrodynamic ram.

Referring now to FIG. 2, a section of a wet wing 10 is shown containing a substructure 12 that forms internal cells 14. The internal cells 14 are defined by spars 16 and ribs 18 and are covered by a composite skin 20. The composite skin 20 is attached to the spars 16 by spar fasteners 22 and to the ribs 18 by rib fasteners 24. The spar and rib fasteners 22 and 24, respectively, may be bolts, rivets, or the like.

The composite skin 20 is composed of graphite/epoxy laid up in the 0°, ±45°, 90° directions. At the points where the composite skin 20 attach to the spars 16, the 0° graphit/epoxy is replaced by 0° fiberglass/epoxy. And, at the points where the composite skin 20 attach to the ribs 18, the 90° graphite/epoxy is replaced by 90° fiberglass/epoxy.

In order to arrest the growth of delamination of the composite skin 20 caused by impact damage, 0° stitches 26 and 90° stitches 28 are applied to the composite skin 20. The 0° stitches 26 and 90° stitches 28 are applied in a configuration that follows the boundaries of and remains within the confines of the internal cells 14 and thereby defines individual blow off panels 30 having corners 31. The configuration of the blow off panels 30 is similar to that of the internal cells 14 and could be substantially square or rectangular in shape although not specifically limited to these shapes.

It is important to recognize that the blow off panels 30 remain within the confines of the respective internal cells 14 and are individually defined by the 0° and 90° stitches 26 and 28, respectively.

Figure 1:
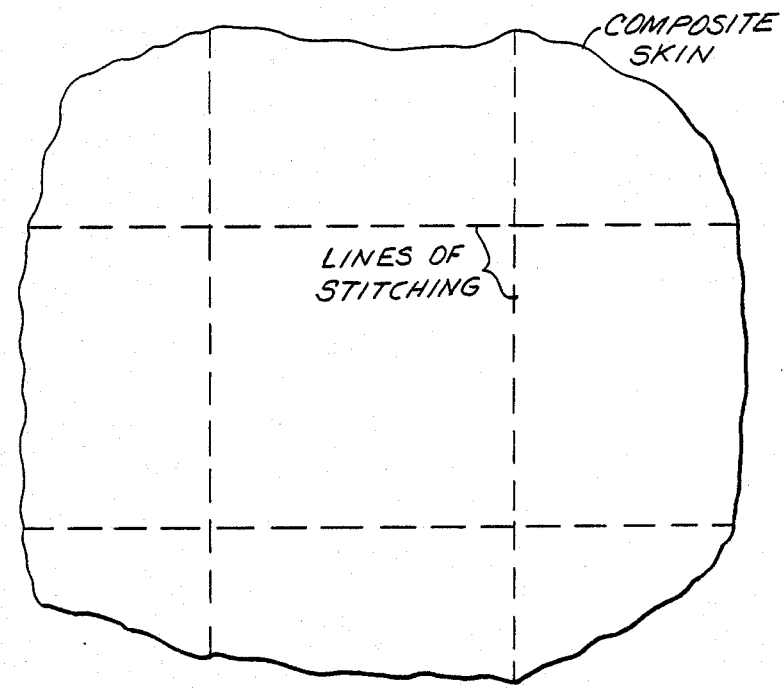
FIG. 1 is a typical section of a wet wing of the prior art employing cross over stitches in the composite skin for controlling delamination.
Figure 3:
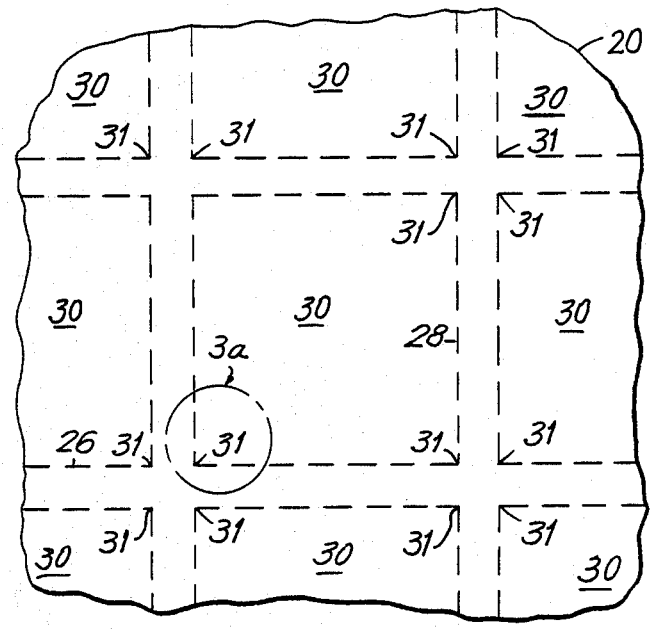
FIG. 3 is a typical section of a wet wing showing the specific stitch configuration of the blow off panel of the present invention shown in FIG. 2 for controlling hydrodynamic ram.
Figure 3A:
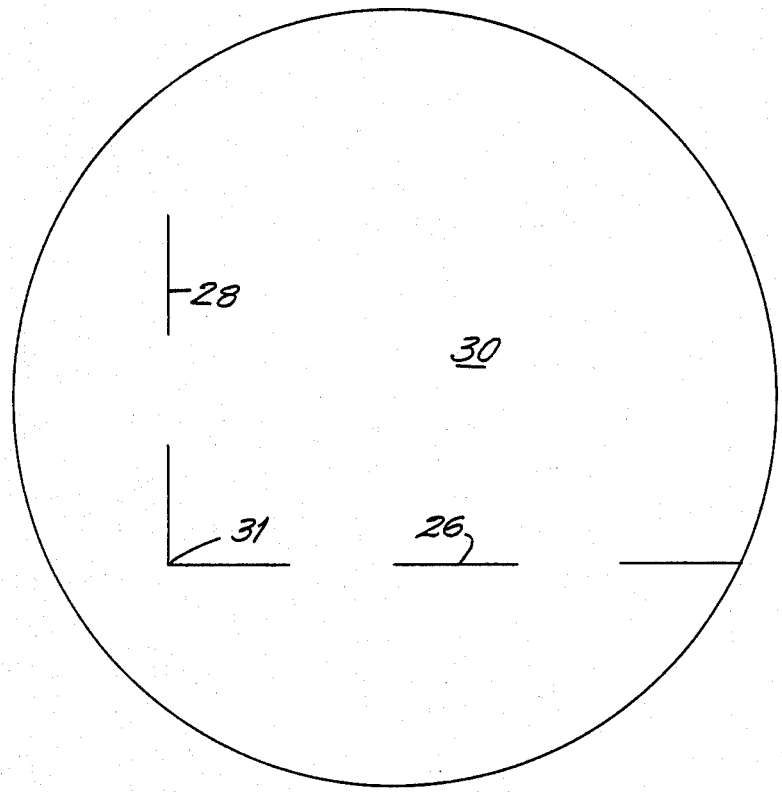
FIG. 3a is a segment of the present invention taken at point 3a of FIG. 3.

It is also to be noted, as shown in FIGS. 3 and 3a, that in order to optimize the performance of the blow off panels 30, the 0° stitches 26 and the 90° stitches 28 preferably intersect at the corners 31 of the blow off panels 30 and preferably do not cross over each other, or end short of each other.

The application of the 0° stitches 26 form 0° stitches perforations 32 in the composite skin 20 while the application of the 90° stitches 28 form 90° stitch perforations 34 in the composite skin 20. The 0° stitch perforations 32 and the 90° stitch perforations 34 form tear off lines that allow the blow off panels 30 to tear along and blow off. By having the 0° stitches 26 and the 90° stitches 28 intersect at the corners 31 of the blow off panels 30, the blow off panels 30 tear off more cleanly and completely.

Figure 4:
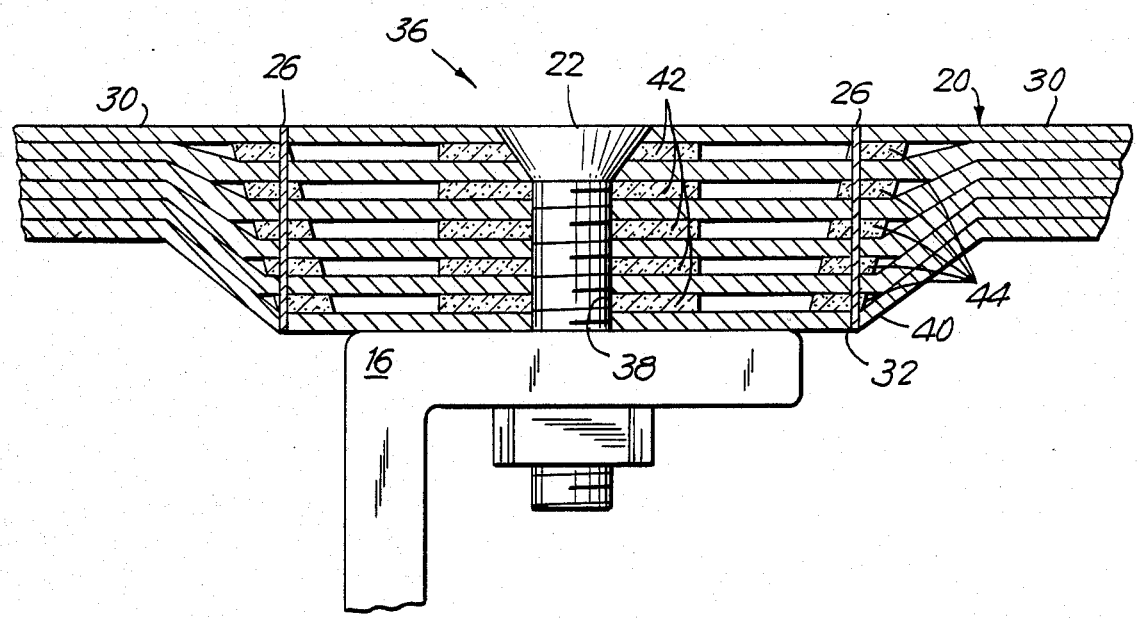
FIG. 4 is a cross section taken along line 4—4 of FIG. 2 showing a typical discrete cap of the present invention.

The composite skin 20 is attached to the spars 16, by the spar fasteners 22, at discrete caps 36 which form an integral part of the composite skin 20. Each discrete cap 36 runs the length of the respective spar 16. A section of a typical discrete cap 36 is shown in FIG. 4. The typical discrete cap 36 contains a central throughbore 38 which receives the spar fastener 22 and includes ramped surfaces 40.

in the area of the central throughbore 38, 0° central softening strips 42 are laid up in the composite skin 20 to replace the 0° graphite/epoxy of the composite skin 20. The 0° central softening strips 42 allow the central throughbore 38 to be made and exist without cracking and reducing the strength of the composite skin 20 and to also allow the composite skin 20 to stretch under strain. Additionally, the 0° central softening strips 42 are a composite made of fiberglass/epoxy.

In the area of the ramped surfaces 40, 0° ramped crack arrestment strips 44 are laid up in the composite skin 20 to replace the 0° graphite/epoxy of the composite skin 20. The 0° ramped crack arrestment strips 44 allow the 0° stitch perforations to be made and exist without cracking and reducing the strength of the composite skin 20 and to also allow the composite skin 20 to stretch under strain. The 0° ramped crack arrestment strips 44 are a composite made of fiberglass/epoxy. In addition to allowing the formation and existence of 0° stitch perforations without cracking and reducing the strength of the composite skin 20, the 0° ramped crack arrestment strips 44 stop the growth of running cracks created by penetration damage.

Figure 5:
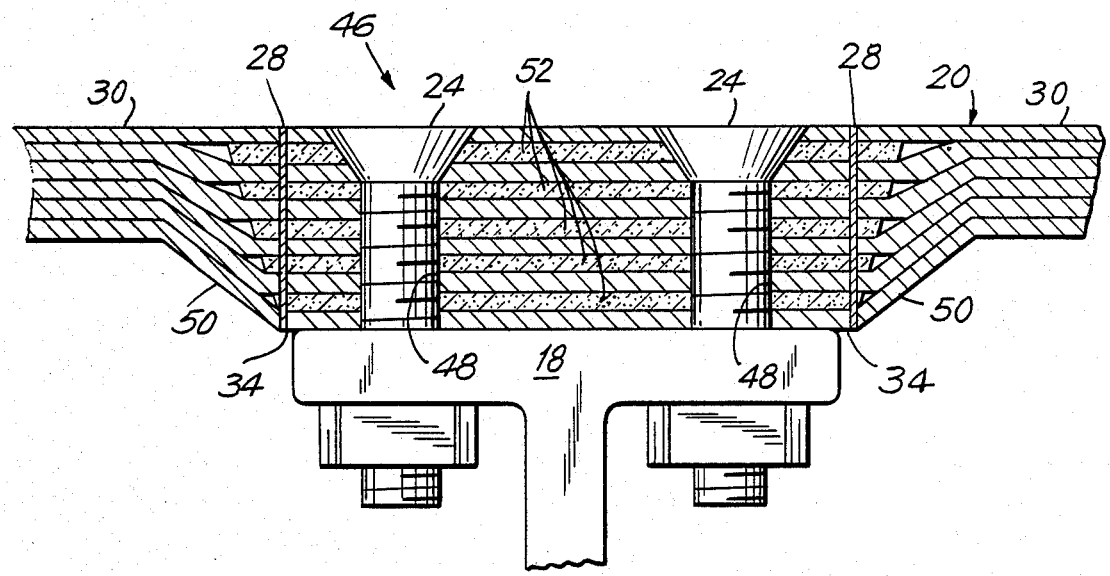
FIG. 5 is a cross section taken along line 5—5 of FIG. 2 showing a typical rib pad of the present invention.

The composite skin 20 is attached to the ribs 18 by the rib fasteners 24, at rib pads 46 which form an integral part of the composite skin 20. Each rib pad 46 runs the length of the respective rib 18. A section of a typical rib pad 46 is shown in FIG. 5. The typical rib pad 46 contains joint throughbores 48 which receive the rib fasteners 24 and includes skew surfaces 50.

In the area of the joint throughbores 48 and the skew surfaces 50 in the composite skin 20, 90° joint softening and crack arrestment strips 52 are laid up in the composite skin 20 to replace the 90° graphite/epoxy of the composite skin 20. The 90° joint softening and crack arrestment strips 52 allow the joint throughbores 48 and the 90° stitch perforations to be made and exist without cracking and reducing the strength of the composite skin 20 and to also allow the composite skin 20 to stretch under strain. The 90° joint softening and crack arrestment strips 52 are a composite made of fiberglass/epoxy. In addition to allowing the formation and existence of the joint throughbore 48 and the 90° stitch perforations without cracking and reducing the strength of the composite skin 20, the 90° joint softening and crack arrestment strips 52 stop the growth of running cracks created by penetration damage.

In operation, when a projectile penetrates a blow off panel 30 of the composite skin 20, catastrophic failure of the wet wing 10 due to propagation does not occur. Fractures radiate from the point of penetration of the projectile and extend to the 0° and 90° stitch perforations 32 and 34, respectively, causing only the damaged blow off panel 30 to blow off due to the effects of hydrodynamic ram. Because the damaged blow off panel 30 is weaker than the adjacent blow off panels 30, it will blow off and release the hydrodynamic ram pressure and thereby prevent damage to the adjacent blow off panels 30.

The 0° and 90° stitch perforations 32 and 34, respectively, define the individual separable blow off panels 30. The blow off panels 30 provide damage tolerance by preventing laminate splitting occuring at the impact and exit areas from spreading into adjacent blow off panels 30. The spreading of laminate splitting into adjacent areas that originated at the impact and exit areas is indicative of hydrodynamic ram failures.

Figure 6:
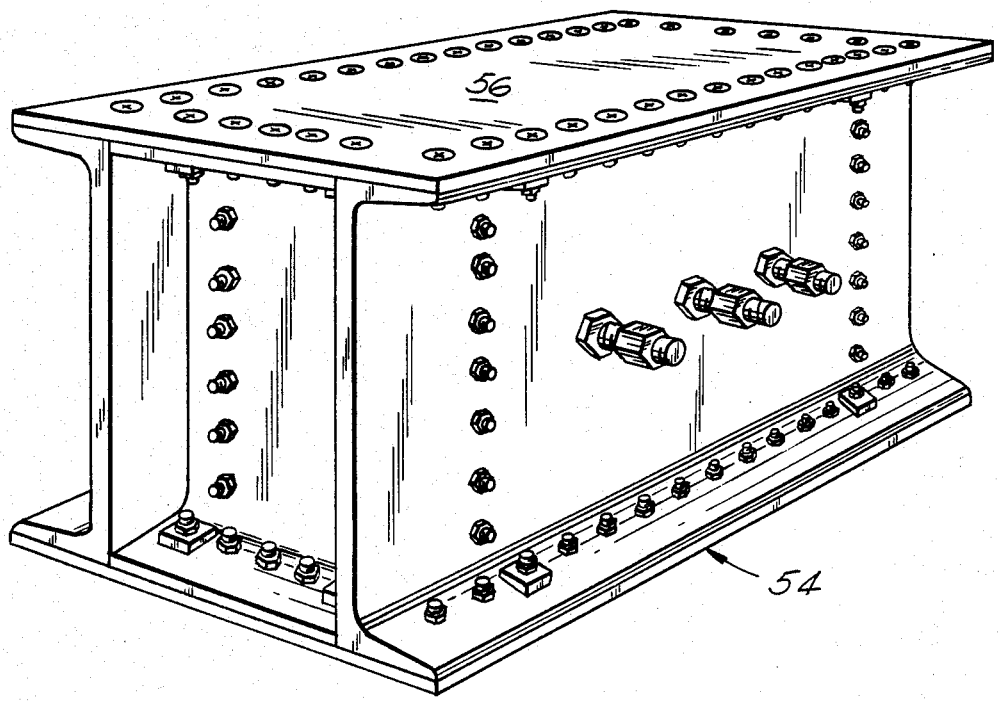
FIG. 6 is a perspective view of a hydrodynamic ram test box.

As a proof of concept, a hydrodynamic ram test box 54, as shown in FIG. 6, was constructed. The hydrodynamic ram test box 54 demonstrated the high strain wing design approach for containing and isolating the damage created from the hydrodynamic ram effect to as samll an area as possible and thereby prevent catastrophic failure of the structure due to propagation.

The hydrodynamic ram test box 54 was completely filled with JP-4 fuel and pressurized to 5.3 psi (DLL pressure). A ⅜ in. dia. annealed steel ball was fired into the entrance cover 56, at zero degree obliquity, at a velocity of 4500 ft/sec. to cause the desired hydrodynamic ram effect. Two Kessler piezoelectric pressure transducers were installed inside the hydrodynamic ram test box 54 to monitor internal pressures during the test.

Figures 7, 8:
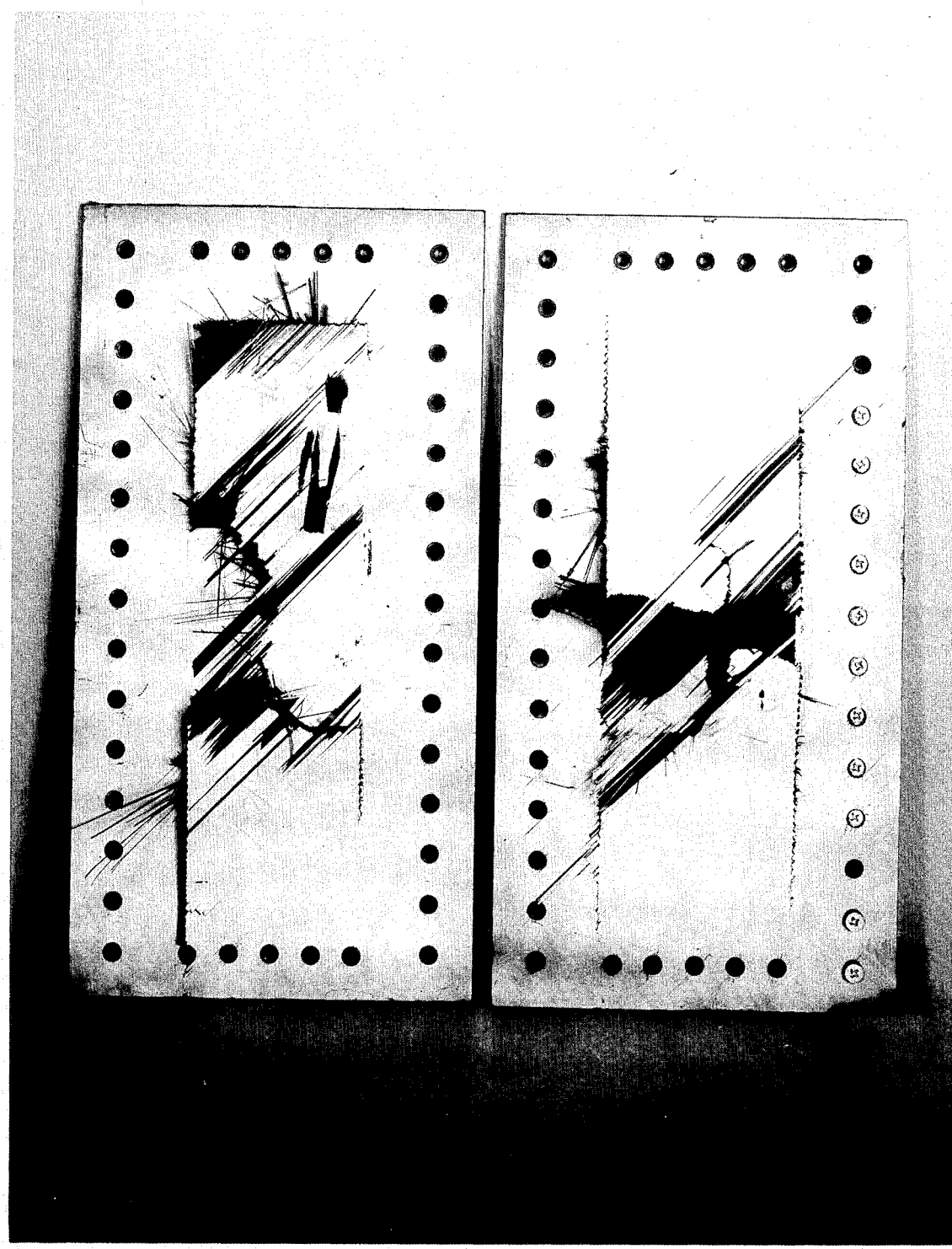
FIG. 7 is a plan view of the entrance cover damage of the hydrodynamic ram test box of FIG. 6.
FIG. 8 is a plan view of the exit cover damage of the hydrodynamic ram test box of FIG. 6.

Referring to FIGS. 7 and 8, the projectile penetrated the hydrodynamic ram test box 54 leaving approximately a ¾ in. dia. hole 58 in the entrance cover 56. Since the transducers were reading 100 percent of their full range capacity (2000 psi), the instantaneous pressure inside the hydrodynamic ram test box 54 was therefore greater than or equal to 2000 psi. A sustained or drag phase pressure was monitored to be 350-400 psi. Three fractures radiating from the entrance penetration 58 extended to the lines of stitches 60 where the basic cover 56 then separated along the lines of stitches 60. The projectile created a massive fracture in the center 62 of the exit cover 64. The basic exit cover panel 64 also separated along the lines of stitches 66.

On entrance cover 56, the lines of stitches 60 include vertical lines of stitches 60a and 60b and horizontal lines of stitches 60c and 60d. As shown, the blow off panel tore off cleanly and completely in the area where the vertical lines of stitches 60a and 60b met the horizontal line of stitches 60c. This is so because the vertical lines of stitches 60a and 60b intersected the horizontal line of stitches 60c. That is, the first and last stitch of the horizontal line of stitches 60c physically touched (intersected but did not cross) the first stitch of the vertical lines of stitches 60a and 60b. Also, as shown on the entrance cover 56, the blow off panel did not tear off cleanly and completely in the area where the vertical lines of stitches 60a and 60b met the horizontal line of stitches 60d. This is so because the vertical lines of stitches 60a and 60b did not intersect the horizontal line of stitches 60d. That is, the first and last stitch of the horizontal line of stitches 60d did not physically touch (did not intersect) the last stitch of the vertical lines of stitches 60a and 60b. Similar results can be seen on exit cover 64.

Thus, it is shown that in order to optimize the performance of the blow off panels 30, the 0° stitches 26 and the 90° stitches 28 should preferably intersect at the corner 31 of the blow off panels 30 and preferably should not cross over each other. That is, the 0° and 90° stitches 26 and 28, respectively, disposed at the corners 31 of the blow off panels 30 should physically touch each other and not cross over each other.

As evidenced by the entrance and exit cover damage shown in FIGS. 7 and 8, respectively, the "blow-off" panel concept, created by the lines of kevlar/epoxy stitches through the fiberglass/epoxy crack arrestment strip, was demonstrated to be feasible and offers significant promise in containing the damage caused by the hydrodynamic ram effect in fuel filled composite primary structures.

It will be understood that each of the elements described above, or two or more together, may also find a useful application in other types of methods and constructions differing from the types described above.

While the invention has been illustrated and described as embodied in a blow off panel for controlling hydrodynamic ram, it is not intended to be limited to the details above, since various mofifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

What is claimed:

1. A wing structure for controlling hydrodynamic ram, comprising:
    (a) a substructure having a plurality of individual cells each with a respective boundary;
    (b) a composite skin disposed on said substructure; and
    (c) first means disposed through said composite skin and defining a plurality of sections in said composite skin such that each section of said plurality of sections of said composite skin is disposed within the confines of said each respective boundary of each of said plurality of individual cells of said substructure so that said each section of said plurality of sections of said composite skin forms a blow off panel for relieving pressure created by hydrodynamic ram in a respective individual cell of said plurality of individual cells of said substructure, said first means including first perforations along which said blow off panel can tear off; and
    (d) second means disposed in said composite skin for preventing said composite skin from cracking from said first perforations and for preventing the growth of running cracks created by penetration damage.

2. A wing structure as defined in claim 1; further comprising stitches disposed in said perforations for arresting the growth of delamination in said composite skin created by impact damage.

3. A wing structure as defined in claim 2, wherein said blow off panels have corners at which said stitches touch so that said blow off panels tear off more cleanly and completely.

4. A wing structure as defined in claim 3, wherein said stitches are a composite.

5. A wing structure as defined in claim 4, wherein said composite stitches are kevlar/epoxy.

6. A wing structure as defined in claim 5, wherein said kevlar/epoxy composite stitches and said composite skin are cocured.

7. A wing structure as defined in claim 1, wherein said second means includes a composite.

8. A wing structure as defined in claim 6, wherein said composite is fiberglass/epoxy.

9. A wing structure as defined in claim 1; further comprising third means for mounting said composite skin to said substructure.

10. A wing structure as defined in claim 9, wherein said composite skin contains second perforations for receiving said third means.

11. A wing structure as defined in claim 10; further comprising fourth means disposed in said composite skin for preventing said composite skin from cracking from said second perforations.

12. A wing structure as defined in claim 11, wherein said fourth means includes a composite.

13. A wing structure as defined in claim 12, wherein said composite is fiberglass/epoxy.

* * * * *